(12) United States Patent
Sengupta et al.

(10) Patent No.: US 8,279,831 B2
(45) Date of Patent: Oct. 2, 2012

(54) SYSTEM, METHOD, AND COMPUTER-READABLE MEDIUM FOR SELECTING A NETWORK FOR CONNECTIVITY AND HANDOVER BASED ON APPLICATION REQUIREMENTS

(75) Inventors: Chaitali Sengupta, Richardson, TX (US); Yuan Kang Lee, San Diego, CA (US)

(73) Assignee: SNRLabs Corporation, Richardson, TX (US)

(*) Notice: Subject to any disclaimer, the term of this patent is extended or adjusted under 35 U.S.C. 154(b) by 1059 days.

(21) Appl. No.: 11/929,066

(22) Filed: Oct. 30, 2007

(65) Prior Publication Data
US 2008/0101292 A1 May 1, 2008

Related U.S. Application Data

(60) Provisional application No. 60/863,931, filed on Nov. 1, 2006.

(51) Int. Cl.
*H04W 4/00* (2009.01)
(52) U.S. Cl. ........................... 370/331; 455/436
(58) Field of Classification Search .................. 370/331; 455/436
See application file for complete search history.

(56) References Cited

U.S. PATENT DOCUMENTS

| 7,009,952 | B1 | 3/2006 | Razavilar et al. | |
|---|---|---|---|---|
| 7,161,914 | B2* | 1/2007 | Shoaib et al. | 370/331 |
| 7,711,366 | B1* | 5/2010 | O'Neil et al. | 455/438 |
| 2005/0159153 | A1 | 7/2005 | Mousseau et al. | |
| 2005/0249161 | A1 | 11/2005 | Carlton | |
| 2006/0025151 | A1 | 2/2006 | Karaoguz et al. | |
| 2007/0014281 | A1* | 1/2007 | Kant | 370/352 |
| 2007/0032239 | A1 | 2/2007 | Shaheen et al. | |
| 2007/0115899 | A1 | 5/2007 | Ovadia et al. | |
| 2007/0173283 | A1* | 7/2007 | Livet et al. | 455/552.1 |

FOREIGN PATENT DOCUMENTS

| WO | WO 02/19736 A2 | 3/2002 |
|---|---|---|
| WO | WO 2004/100452 A1 | 11/2004 |
| WO | WO 2006/078627 A2 | 7/2006 |
| WO | WO 2007/026267 A2 | 3/2007 |

OTHER PUBLICATIONS

PCT International Preliminary Examining Authority—European Patent Office, PCT Notification of Transmittal of the International Preliminary Report on Patentability mailed Feb. 6, 2009, International Application No. PCT/US2007/083129, filed Oct. 31, 2007, 11 pages, NL-2280 HV Rijswijk.
3GPP SA WG2, 3rd Generation Partnership Project; Technical Specification Group Services and Architecture; Feasibility Study on Multimedia Session Continuity; Stage 2; (Release 8), 3GPP TR 23.893 (Oct. 2007), 3GPP Technical Recommendation, Oct. 23, 2007, pp. 1033, XP002474433, URL:http://www.3gpp.org/ftp/Specs/archive/23_series/23.893/23893-030.zip.

(Continued)

*Primary Examiner* — Sai-Ming Chan
(74) *Attorney, Agent, or Firm* — Jones Day

(57) ABSTRACT

A system, method, and computer-readable medium are provided for choosing a network for connection and handover based on the application requirements of a multi-mode, multi-radio user equipment. The selection of the network for connectivity and handover is based on one or more of the invoking of an application, the invoking of a second application, and the closing of an application.

13 Claims, 2 Drawing Sheets

OTHER PUBLICATIONS

PCT International Searching Authority—European Patent Office, PCT Notification of Transmittal of the International Search Report and the Written Opinion of the International Searching Authority, or the Declaration, International Application No. PCT/US2007/083129, filed Oct. 31, 2007, Apr. 14, 2008, 11 pages, NL-2280 HV Rijswijk.

3GPP SA WG2, 3rd Generation Partnership Project; Technical Specification Group Services and System Aspects; Voice Call Continuity (VCC) between Circuit Switched (CS) and IP Multimedia Subsystem (IMS); Stage 2; (Release 7), 3GPP TS 23.206 V7.0.0 (Sep. 2006), Technical Specification, Oct. 4, 2006, pp. 1-33, XP002465453, URL:http://www.3gpp.org/ftp/Specs/archive/23_series/23.206/23206-700.zip.

PCT International Preliminary Examining Authority—European Patent Office, PCT Notification of Transmittal of the International Preliminary Report on Patentability mailed Jun. 2, 2009, International Application No. PCT/US2009/031291, filed Jan. 16, 2009, 13 pages, NL-2280 HV Rijswijk.

* cited by examiner

SYSTEM, METHOD, AND COMPUTER-READABLE MEDIUM FOR SELECTING A NETWORK FOR CONNECTIVITY AND HANDOVER BASED ON APPLICATION REQUIREMENTS

RELATED APPLICATION DATA

This patent application claims the benefit of provisional U.S. Patent Application Ser. No. 60/863,931, filed Nov. 1, 2006, which is hereby incorporated by reference. The following applications also claim priority to the above referenced provisional application and are related to the present application. They are incorporated by reference herein.

Copending U.S. Utility patent application Ser. No. 11/929,231, filed on Oct. 30, 2007 and entitled "System, Method, and Computer-Readable Medium for User Equipment Decision-Making Criteria for Connectivity and Handover"

Copending U.S. Utility patent application Ser. No. 11/929,376, filed on Oct. 30, 2007 and entitled "System, Method, and Computer-Readable Medium for User Equipment Managing Multiple Radio Networks for Handover and Low-Power Operations"

BACKGROUND

A multi-mode, multi-radio user equipment is capable of obtaining services through multiple radio networks, for example, via a wireless wide area network (WWAN) such as GSM/UMTS and via a wireless local area network (WLAN) such as 802.11a/b/g. Such a user equipment must decide on which network it should attach, begin active services, and to which network it must handover its active services.

One of the main attributes of a multi-mode, multi-radio user equipment is its capability to offer a rich set of applications. Instead of simply offering a voice call application, a modern multi-mode, multi-radio user equipment may offer both basic applications and more advanced ones such as web browsing, video sharing, location-based services, peer-to-peer file sharing, etc. A modern multi-mode multi-radio user equipment may be looked at less like a phone but more like a sophisticated multimedia computer and communicator.

Disadvantageously, some applications may be better suited for a particular network environment relative to other network environments on which the user equipment may attach. Thus, a user equipment may be attach to a particular network and may remain attached thereto regardless of the applications run on the user equipment.

BRIEF DESCRIPTION OF THE DRAWINGS

Aspects of the present disclosure are best understood from the following detailed description when read with the accompanying figures, in which.

DETAILED DESCRIPTION

Figure 1:
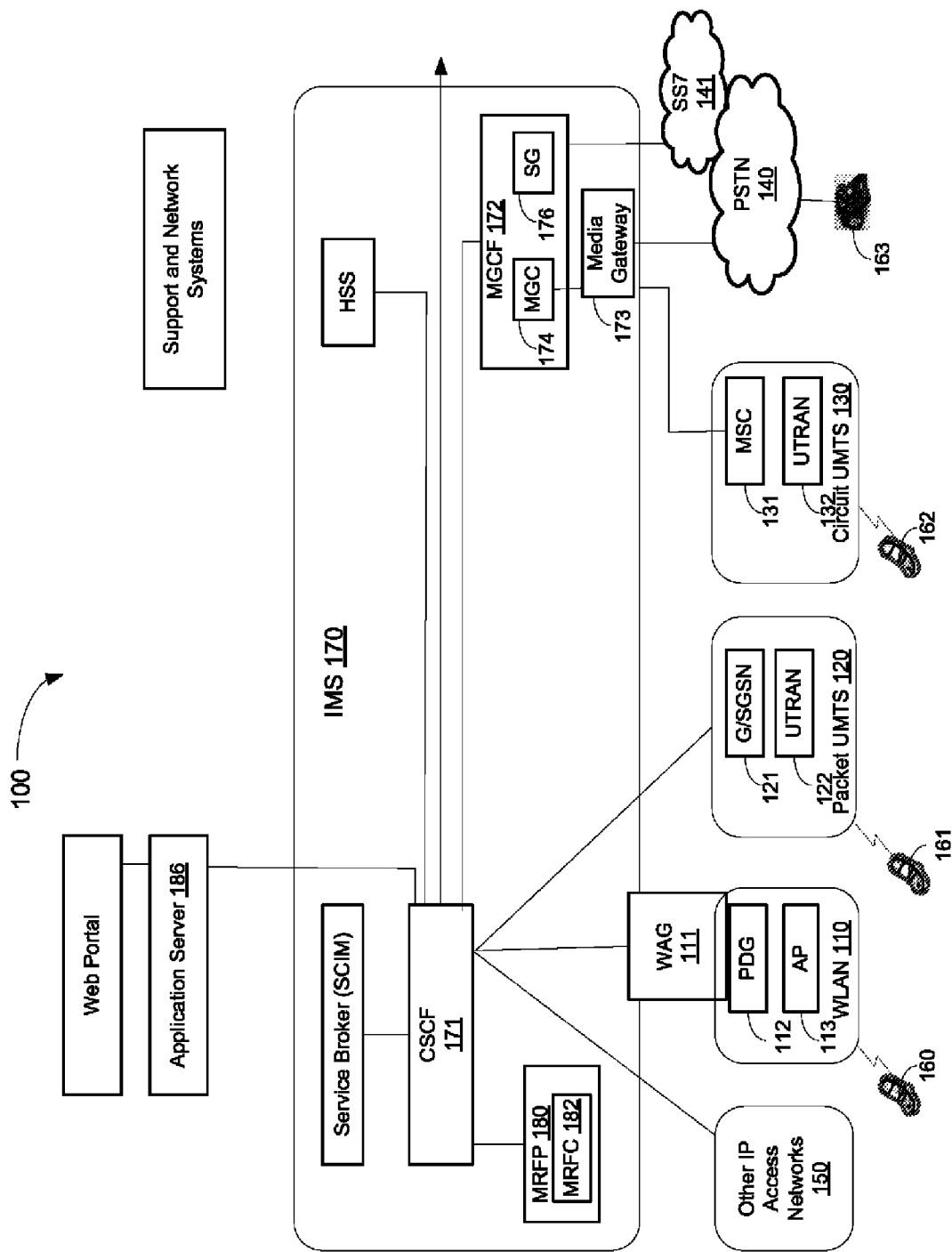
FIG. 1 is a diagrammatic representation of an embodiment of a network system in which IMS (IP Multimedia Subsystem) may be deployed in accordance with an embodiment.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an embodiment of a network system 100 in which IMS may be deployed. FIG. 1 is intended as an example, and not as an architectural limitation, of embodiments described herein. IMS infrastructure may be deployed in stages and may include infrastructure developed and manufactured by a variety of vendors that may be deployed by any number of service carriers or operators. System 100 may include any variety of access networks. In the illustrative example, system 100 includes a wireless local area network (WLAN) 110, e.g., a network implemented in compliance with the IEEE 802.11 standards, a packet switched universal mobile telecommunications system (UMTS) 120, a circuit switched UMTS 130, a public switched telephone network (PSTN) 140 and corresponding signaling system 141, such as a signaling system #7 network, and other IP access networks 150. PSTN 140 provides circuit switched telecommunication services to one or more circuit switched end points 163. WLAN 110 may interface with IMS 170 via WLAN access gateway (WAG) 111. WLAN 110 may include a packet data gateway (PDG) 112, one or more access points 113 that may provide wireless access to user equipments (UEs) 160-162, and various other equipment as is understood. Packet UMTS 120 may include one or more gateway general packet radio service (GPRS) support nodes (GGSNs) and serving GPRS support nodes (SGSNs) (collectively referred to herein as G/SGSN 121. Packet switched UMTS 120 may include a UMTS radio access network (UTRAN) 122 that may provide radio access to UEs 160-162 and various other equipment as is understood. WAG 111 comprises a gateway between WLAN 110 and 3GPP/IMS network 100. A Packet Data Gateway (PDG) 112 provides access to PS-based services for a WLAN UE. Circuit UMTS 130 may include a mobile services switching center (MSC) 131, a UTRAN 132, and various other equipment as is understood.

Various terminals may connect with one or more of the access networks. As referred to herein, a user equipment (UE) comprises a terminal or station that may connect with one or more access networks for establishing a session with an entity of system 100 or another user equipment or terminal connected with one or more of the access networks of system 100 or another telecommunication system. In the depicted example, UE 160 is connected with WLAN 110, UE 161 is connected with packet UMTS 120, and UE 162 is connected with circuit UMTS 130. Additionally, an analog endpoint 163, such as an analog telephone, is connected with PSTN 140. Some UEs may be adapted to connect, in some instances concurrently, with multiple access networks. A UE adapted to connect with multiple access networks is referred to herein as a multi-mode UE or device.

IMS 170 may include various functions, nodes, or other entities, and those depicted in FIG. 1 are illustrated to facilitate an understanding of embodiments disclosed herein. Call Session Control Function (CSCF) 171 may act as Proxy CSCF (P-CSCF), Serving CSCF (S-CSCF) or Interrogating CSCF (I-CSCF).

SIP may be used as the protocol for communications between a UE with CSCF 171. A Media Gateway Control Function (MGCF) 172 controls the parts of the call state that pertain to connection control for media channels in an IMS-media gateway (MGW), e.g., MGW 173. MGCF 172 may communicate with CSCF 171, a breakout gateway control function (BGCF), e.g., a SIP server that includes routing functionality based on telephone numbers, and PSTN 140 entities. Additionally, MGCF 172 may determine the next hop depending on the routing number for incoming calls from legacy networks. MGCF 172 may include or interface with a media gateway controller (MGC) 174 and a signaling gateway 176.

IMS-MGW 173 may terminate bearer channels from a circuit switched network, e.g., PSTN 140, and media streams, e.g., RTP streams in an IP network, from a packet network, e.g., packet UMTS 120. IMS-MGW 173 may support media conversion, bearer control and payload processing, e.g. codec, echo canceller, conference bridging, and the like. IMS-MGW 173 may interact with MGCF 172 for resource control, own and handle resources such as echo cancellers, etc, and may be equipped with codecs.

A Multimedia Resource Function Controller (MRFC) 182 may control media stream resources in a Multimedia Resource Function Processor (MRFP) 180, interpret information coming from an application server (AS) 186 and S-CSCF, e.g., a session identifier, and control MRFP 180 accordingly.

MRFP 180 may control IP bearers, provide resources to be controlled by MRFC 182, mix incoming media streams, e.g., for multiple parties, sources media streams (for multimedia announcements), and process media streams, e.g., audio transcoding, media analysis, and the like, and perform floor control, i.e., manage access rights to shared resources in a conferencing environment.

Application Server 186, e.g., a SIP Application Server, OSA Application Server, CAMEL IM-SSF application server, or other application server, may offer value added services to system 100 and reside either in the user's home network or in a third party location. The third party could be a network or simply a stand-alone AS. Application Server 186 may influence and impact a SIP session on behalf of the services supported by the operator's network. An AS may host and execute services.

IMS functioning is access network agnostic. However, the connectivity of each access network to the IMS infrastructure is specific to the access network.

Voice Call Continuity (VCC) from circuit UMTS 130 to IMS 170 (VoIP over IMS) is being specified in 3GPP. Two logical functions, a Call Continuity Control Function (CCCF) and Network Domain Selection (NeDS), are added to the architecture to support VCC.

The Call Continuity Control Function provides for reception and processing of call continuity requests caused by radio related events, e.g., availability or loss of radio coverage, and establishment and release of call legs needed to transfer a voice call from the CS domain to the IMS domain, or vice versa.

Network Domain Selection (NeDS) comprises the control point for selecting which domain to use for terminating a call. Normally it may be expected that a CS terminating call will terminate on the CS side of a multi-mode terminal, and an IMS terminating call will terminate on the IMS side of a multi-mode terminal, although there are situations where the selection of the other domain is appropriate, e.g., in the case of a CS terminating call when the terminal is not CS-attached but is IMS registered. In addition to technical considerations, user preferences and service availability considerations may be considered and may be implemented in the NeDS function. The UE may be registered to both domains and may choose to originate a voice call (or session) via either CS or IMS domain, depending on operator offered choices.

A UE facing an infrastructure such as the one depicted in FIG. 1 faces a variety of challenges ranging from supporting several new applications enabled by IMS, protocols required by those services such as SIP/SDP/RTP/etc., and handheld devices with multiple radios.

Exemplary applications and services that may be supported by IMS 170 include web browsing, video sharing, video telephony and conferencing, push to talk over cellular, presence services, instant messaging, multiplayer games, and concurrent IMS services and CS voice services.

With smart phones being adapted with more and more features of PDAs and PCs, the software component of the phone is gaining precedence over radio hardware that was the focus of 2.5G generation GSM/GPRS/IS-95 phones. A high level OS, e.g., Microsoft, Linux, Symbian, etc., is critical, with an ever increasing number of software components to be integrated including IMS client frameworks, new network and session management software, e.g., SIP/SDP, and RTP/RTCP, and richer telephony interface layers.

Figure 2:
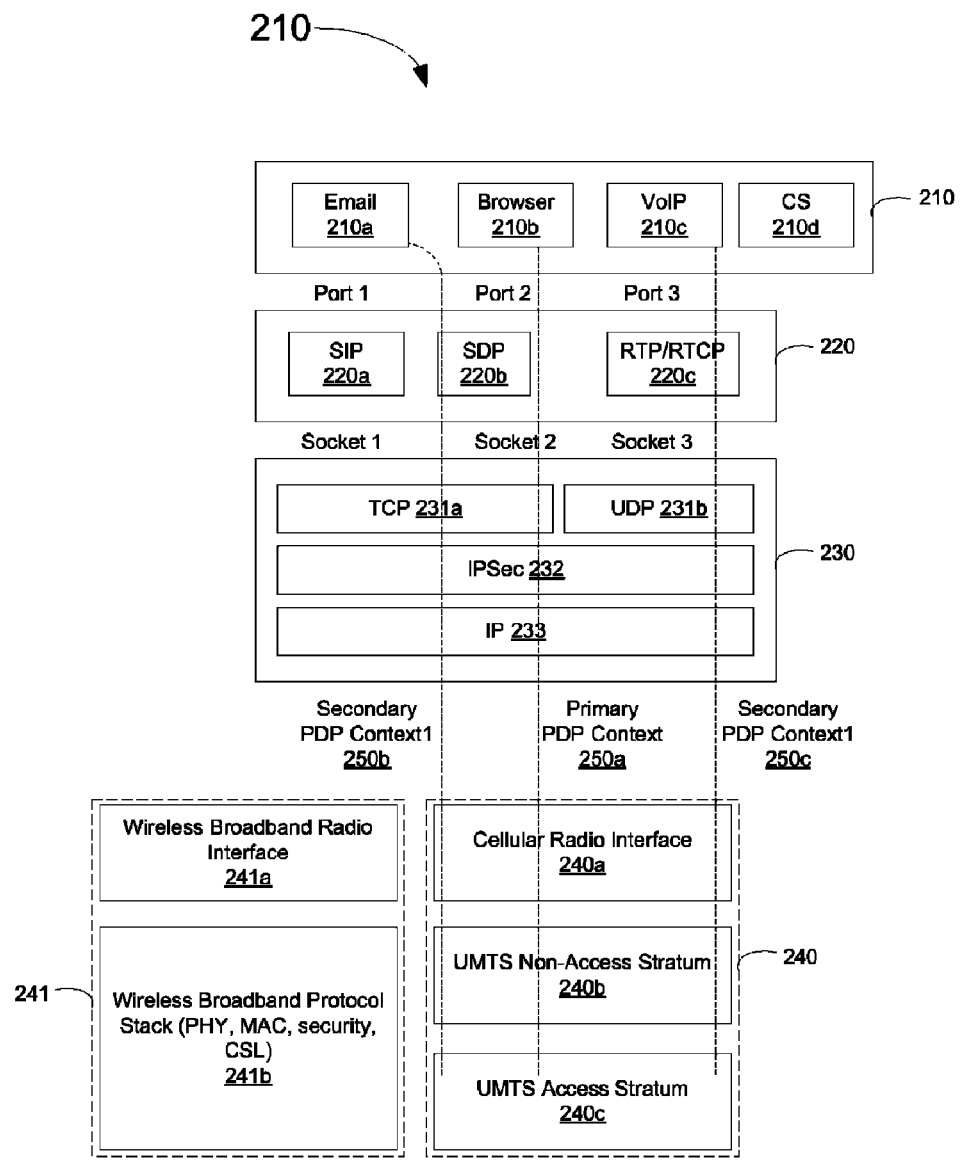
FIG. 2 depicts a diagrammatic representation of an embodiment of a multi-mode terminal.

With reference now to FIG. 2, an exemplary software configuration 200 of a converged terminal is depicted. Various applications 210 may be deployed in configuration 200. In the illustrative example, applications 210 include an Email application 210a, a browser application 210b, a VoIP application 210c, and a circuit-switched application 210d. Applications 210 are bound to application layer 220, e.g., via traditional sockets and ports as shown in FIG. 2. In the illustrative example, application layer 220 includes SIP 220a, SDP 220b, and RTC/RTCP 220c.

SIP 220a is an application layer protocol. Session Initiation Protocol (SIP) was developed and designed within the Internet Engineering Task Force (IETF). SIP is a request-response signaling protocol for setting up and starting voice, video, and instant messaging communication sessions over the Internet.

SIP's essential communication function is aided by extensions and further protocols and standards. Two protocols commonly used are the Session Description Protocol (SDP) 220b and Real-time Transport protocol 220c (RTP).

RTP 220c is used to carry session payload data, such as real-time multimedia data such as audio, video, and text. RTP 220c encodes and splits the data into packets and transports such packets over the Internet. RTP 220c is frequently used in streaming media systems as well as videoconferencing and push to talk systems making it the technical foundation of the Voice over IP industry. RTP may be used in conjunction with the RTP Control Protocol (RTCP) and it is built on top of the User Datagram Protocol (UDP).

SDP 220b describes and encodes capabilities of session participants. Such a description is then used to negotiate the characteristics of the session so that all devices can participate. Hence, SIP, SDP, and RTP/RTCP are necessary to implement an application such as a "SIP-based VoIP" protocol.

Application layer 210 may interface with lower layers of network stack 230. In the illustrative example, network stack 230 includes a transmission control protocol (TCP) 231a and a user datagram protocol (UDP) 231b transport layers, an IP security (IPSec) 232 layer, and an IP 233 network layer, although other transport and network layers may be suitably substituted for those depicted.

Convergent terminals require the support of multiple protocol stacks 240 and 241 and multiple radios as shown in FIG. 2. The first impact is on the hardware that requires integration of the modem basebands onto the same system. In typical designs, the basebands of the various modems are implemented on different chips. Additionally, a converged device may feature the co-existence and simultaneous activity of multiple radios. The multiple modems need to be able to communicate with upper layers (typically IP) via identifiers such as the UMTS PDP contexts 250a-250c (illustratively designated with dashed lines) shown in FIG. 2. Each primary PDP context 250a is associated with a unique PDP address (which includes the IP address) and each secondary PDP context 250b-250c is associated with a primary context and helps support multiple QoS streams required by different applications supported in lower layers via different radio access bearers. Major cellular standards as well as emerging wireless broadband standards, such as WiMax, support well defined QoS classes. In the illustrative example, configuration 200 includes a first protocol stack 240 adapted to accommodate UMTS access and includes a cellular radio interface 240a, a UMTS non-access stratum 240b, and a UMTS access stratum 240c. A second protocol stack 241 adapted to accommodate wireless radio broadband access network may include a wireless broadband radio interface 241a and a wireless broadband protocol stack 241b, e.g., a wireless broadband physical (PHY) layer, media access control (MAC) layer, security and CSL layers, or the like.

Additionally, a converged device may feature a High level OS (HLOS), such as Symbian, Linux, and Microsoft Windows Mobile. HLOS vendors or associated groups, such as Mobilinux Open Framework, are offering more integrated features in their software packages such as IPv6, 2.5G and 3G radio interface layers and connectivity management software.

A profile of applications supported by the UE may be used for connectivity and handover decisions, for example latency requirements, bandwidth requirements (qualitative/quantitative). The available applications supported by each available access system may be considered for connectivity/handover decisions. In accordance with embodiments, an inter-system connectivity and handover decision entity is disposed in the UE as are the connectivity and handover execution entities.

Periodically the handover decision entity in the UE executes the following steps:
  collect network strength indications from each of the radios; and
  collect battery information from battery monitor.

For each on-going application, the following evaluation steps may be executed:
  Is the current connectivity the "best" one based on information connected in the previous step and the input sources including the set of rules provided by the service provider, user profile based on usage, user profile based on service subscriptions, and the profile of applications supported by the UE. If yes, do nothing, if no either automatically handover to a new access connectivity, or notify the user and request a decision.

The UE may execute the following steps for connectivity/handover when certain "events" occur. Exemplary events include:
  User wants to start a certain application: An action for this event is determining what the best access network for this application is and initiate connectivity based on analysis of all the sources of input information.

As described, mechanisms are provided for choosing a network for connection and handover based on the application requirements of a multi-mode, multi-radio user equipment. The selection of the network for connectivity and handover is based on one or more of the invoking of an application, the invoking of a second application, and the closing of an application.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure. For example, descriptions of a UE convergence manager have been provided in the context of a UE deployed in a network system featuring IMS. However, such a network system is not necessary, but rather advantages may be had by implementation of embodiments disclosed herein in any multi-mode network system that features multiple access network technologies with or without IMS. Accordingly, all such changes, substitutions and alterations are intended to be included within the scope of the present disclosure as defined in the following claims.

What is claimed is:

1. A method of selecting a network from a plurality of available access networks, comprising:
  identifying, by using a wireless user equipment, the plurality of access networks;
  identifying, by using a wireless user equipment, an invoked application;
  selecting, by using a wireless user equipment, a first access network from the plurality of access networks based, at least in part, on the application; and
  wherein a connection is established to the first access network in response to opening the application;
  wherein a handover procedure is invoked from the first access network to a second access network of the plurality of access networks in response to opening or closing the application.

2. The method of claim 1, wherein the plurality of access networks include one or more of a wireless network and wired network.

3. The method of claim 2, wherein the plurality of access networks each comprise one of a circuit-switched network and a packet-switched network.

4. The method of claim 1, further comprising:
invoking a handover procedure from the first access network to a second access network of the plurality of access networks, wherein the second access network is selected from the plurality of access networks based on a second application determined to be invoked.

5. A communication system, comprising:
a first access network operating in conjunction with a first radio access technology;
a second access network operating in conjunction with a second radio access technology; and
a wireless user equipment adapted to terminate a first communication link with the first access network and a second communication link with the second access network, wherein the wireless user equipment includes a convergence manager adapted to select one of the first access network and the second access network for service access based at least in part on an application hosted by the user equipment;
wherein the convergence manager selects an access network based at least in part on invocation or closing of the application.

6. The system of claim 5, wherein the first access network and the second access network each respectively comprise one of a circuit-switched access network and a packet-switched access network.

7. The system of claim 5, wherein the user equipment is attached with the first access network, wherein the convergence manager invokes a handover procedure from the first access network to the second access network in response to determining a second application has been invoked by the user equipment.

8. The system of claim 5, further comprising invoking a handover procedure from the first access network to the second access network in response to the closing of the application.

9. A computer-readable medium having computer-executable instructions for execution by a processing system, the computer-executable instructions for selecting a network from a plurality of available access networks, comprising:
instructions that identify the plurality of access networks;
instructions that determine an application expected to be used by a user equipment;
instructions that select a first access network from the plurality of access networks based, at least in part, on the application; and
instructions that connect the user equipment to the first access network in response to opening the application;
instructions that invoke wherein a handover procedure is invoked from the first access network to a second access network of the plurality of access networks in response to opening or closing the application.

10. The computer-readable medium of claim 9, wherein the plurality of access networks include one or more of a wireless network and wired network.

11. The computer-readable medium of claim 10, wherein the plurality of access networks each comprise one of a circuit-switched network and a packet-switched network.

12. The computer-readable medium of claim 9, further comprising instructions that invoke a handover procedure from the first access network to a second access network of the plurality of access networks, wherein the second access network is selected from the plurality of access networks based on a second application invoked by the user equipment.

13. The computer-readable medium of claim 9, further comprising instructions that invoke a the handover procedure from the first access network to a second access network of the plurality of access networks in response to the closing of the application.

* * * * *